United States Patent [19]
Kaneshige

[11] Patent Number: 5,536,399
[45] Date of Patent: Jul. 16, 1996

[54] FILTER DEVICE

[75] Inventor: Noritsugu Kaneshige, Nara, Japan

[73] Assignee: Aska Corporation, Yamatokohriyama, Japan

[21] Appl. No.: 208,276

[22] Filed: Mar. 10, 1994

[30] Foreign Application Priority Data

Mar. 11, 1993 [JP] Japan .................................. 5-050855

[51] Int. Cl.⁶ ........................... B01D 35/12; B01D 35/16; B01D 35/18; B01D 35/30
[52] U.S. Cl. ........................ 210/184; 210/186; 210/232; 210/340; 425/199
[58] Field of Search .................................. 210/184, 185, 210/186, 232, 237, 238, 340, 341; 425/199

[56] References Cited

U.S. PATENT DOCUMENTS

| | | |
|---|---|---|
| 2,525,000 | 10/1950 | Seligman. |
| 2,656,930 | 10/1953 | De Vries. |
| 3,727,767 | 4/1973 | Itter. |
| 3,825,121 | 7/1974 | Irving. |
| 4,191,648 | 3/1980 | Kaplan. |
| 4,298,469 | 11/1981 | LeBlanc. |
| 5,211,845 | 5/1993 | Kaneshige. |

*Primary Examiner*—Thomas M. Lithgow
*Attorney, Agent, or Firm*—Wenderoth, Lind & Ponack

[57] ABSTRACT

The filter devices allow easy cleaning of various joint portions such as those located near changeover valves of the filter devices. Heating units which accommodate filter cases may be formed with openings which allow such joint portions between the filter cases and the heating units to be accessed and cleaned. Alternatively, the heating units may include two relatively movable parts which, when opened, allow the joint portions to be accessed once the filter cases are removed. The heating units themselves may be detachable from a support frame so as to expose other joint portions.

2 Claims, 4 Drawing Sheets

FILTER DEVICE

BACKGROUND OF THE INVENTION

This invention relates to a filter device for use in various kinds of plants to purify a fluid by removing dust and foreign matter therefrom.

When any filter element in a filter device clogs, it has to be exchanged after stopping the flow of fluid. In order to solve this problem, a filter device was proposed which comprises a plurality of filter cases and a flow changeover device. If the filter element in one of the filter cases should clog, it can be taken out and exchanged without stopping the flow of fluid through the filter device.

This type of filter device is widely used in the industry because filter elements can be exchanged without the necessity of stopping the flow of fluid. Since it is not necessary to stop the flow of fluid, the plant does not have to be stopped and restarted each time a filter element clogs. This eliminates the related work and shortens the downtime of the plant to a minimum.

The filter devices of the type in which any clogged filter elements can be exchanged without stopping the flow of fluid can be classified into two groups according to the way in which the filter cases are cleaned and the filter elements are recycled.

(1) Only the filter elements are removed from the filter cases while leaving the filter cases coupled to the changeover device. The filter elements are recycled outside the filter device. The filter device and its peripheral parts are cleaned with a suitable solvent while the plant is kept in operation by use of another filter case.

(2) The filter elements are removed from the changeover device together with the filter cases. The filter cases are disassembled and cleaned outside the filter device.

In the first method, since the filter cases and their peripheral parts are cleaned with a solvent, every part of the filter device can be cleaned completely and will never contaminate the fluid introduced into the device thereafter. But this method has the following problems.

1) A solvent which is classified as a dangerous substance has to be used at the site where the filter device is installed.

2) Peripheral electric parts have to be made explosion-proof. This increases the installation cost.

3) An inlet/outlet port for solvent has to be provided near the changeover device. This not only requires extra cost but will complicate the entire structure of the changeover device.

The second method is safe and convenient in that the filter elements are exchanged together with their cases. This arrangement has another advantage in that the filter cases dismounted can be consigned to an outside source for cleaning. Further, the entire device is compact and inexpensive. Thus, this method is more widely employed in the art.

But the second method has a problem in that it is impossible to clean the joint portions between the changeover device and the filter cases. Heretofore, any dirt on these portions had to be wiped off with a cloth or the joint portion had to be washed by keeping a fluid running for a while after connecting the filter cases to the changeover device before starting the operation.

If the filter device is used to filter a synthetic resin that hardens while not heated, the entire device has to be heated. In such a case, heating units will be a major obstacle in cleaning the joint portions between the detachable members and the permanently fixed members. Also, it is difficult to completely wash down any dirt on such joint portions with a running fluid. This might cause frequent machine trouble after exchanging the filter element. The use of such devices cannot be adopted especially if it is necessary to remove dirt and dust of a size on the order of several microns such as in yarn reeling and film forming.

SUMMARY OF THE INVENTION

An object of this invention is to provide a filter device which has improved structure for mounting heating units and which allows easy cleaning of the joint portions.

According to the first embodiment in the present invention, there is provided a filter device comprising a plurality of separate cylindrical heating units, a plurality of filter cases for accommodating filter elements, and a changeover means for changing the direction of flow of a substance to be filtered so as to flow through a selected one of the filter cases, the filter cases being housed in the heating units, and each heating unit being formed with a through-hole which allows the inside of the heating unit to be accessed.

Once the filter cases are removed from the filter device, joint portions are easily accessible through the holes formed in the heating units for cleaning.

According to the second embodiment, the filter device comprises a plurality of separate cylindrical heating units, a plurality of filter cases each accommodating a filter element, and a changeover means for changing the direction of flow of a substance to be filtered so as to flow through a selected one of the filter cases, the filter cases being housed in the heating units, and each heating unit being split into two parts which can be moved relative to each other between open and closed positions.

After removing the filter cases from the filter device, the heating units are opened to expose the joint portions between the filter cases and the heating units. Thus, these joint portions can be cleaned easily.

Further, according to the third embodiment, the filter device comprises a support frame, a plurality of separate cylindrical heating units, a plurality of filter cases each accommodating a filter element, and a changeover means for changing the direction of flow of a substance to be filtered so as to flow through a selected one of the filter cases, the filter cases being housed in the heating units, and each heating unit being detachably mounted to the support frame.

After removing the filter cases from the filter device, the heating units can be taken out to expose joint portions between the heating units and the changeover means. Thus, these joint portions can be cleaned easily.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

In the first embodiment shown in FIGS. 1–4, the filter device comprises a support frame 1 and heating units 2 formed with openings at the top thereof and extending vertically at both sides of the support frame 1. Changeover valves 3 and 4 are provided between the heating units 2 at upper and lower ends thereof, respectively. Filter cases 5 are mounted in the heating units 2 so as to be removable from the top.

Figure 3:
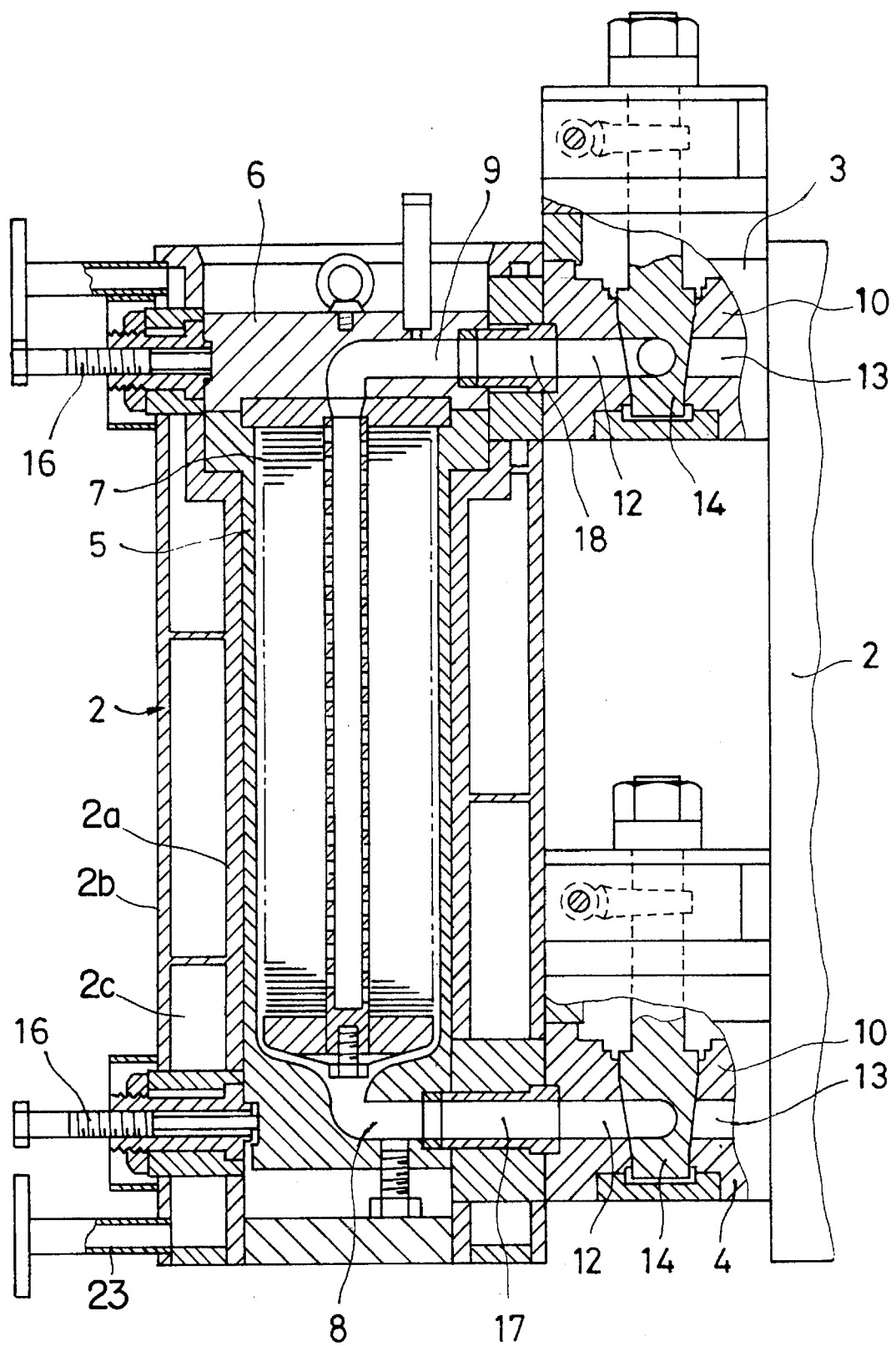
FIG. 3 is an enlarged vertical sectional view of a portion of the same.

As shown in FIG. 3, one of the filter cases 5 detachably accommodating filter elements 7 is in the form of a hollow cylindrical wall closed by a lid 6 bolted to the top of the cylindrical wall. Near both ends of the filter cases 5 are formed an inlet passage 8 and an outlet passage 9 which are open to the changeover valves 3 and 4, respectively.

The changeover valves 3 and 4 have an inlet/outlet fluid passage 11 and inlet/outlet passages 12 and 13 which are open at both sides thereof. These passages are formed in a valve casing 10 in the form of a rectangular block. By turning a valve body 14 with a handle 15, one of the inlet/outlet passages 12 and 13 can be selectively placed in communication with the inlet/outlet passage 11.

The filter case 5 is fixed to the heating unit 2 by tightening bolts 16 extending through the heating unit 2. The inlet 8 communicates with one of the inlet/outlet passages 12 and 13 of the lower changeover valve 4 through a passage 17 formed in the heating unit 2. On the other hand, the outlet 9 communicates with one of the inlet/outlet passages 12 and 13 of the upper changeover valve 3 through a passage 18 formed in the heating unit 2.

In the embodiment, the filter case 5 is pressed against the changeover valves 3 and 4 by tightening the bolts 16 but it may instead be detachably fixed to each of the changeover valves 3 and 4 by a bolt.

In the illustrated embodiment, each of the heating units is hollow, namely is made up of inner 2a and outer 2b cylindrical walls radially spaced from one another to define a fluid-accommodating space 2c therebetween, and is heated by a heating medium heated by a separate heat source and supplied into the space 2c of each heating unit via heating pipes 23. The units 2 may instead be heated by an electrically heated hot plate and covered with a heat insulating material.

Figure 1:
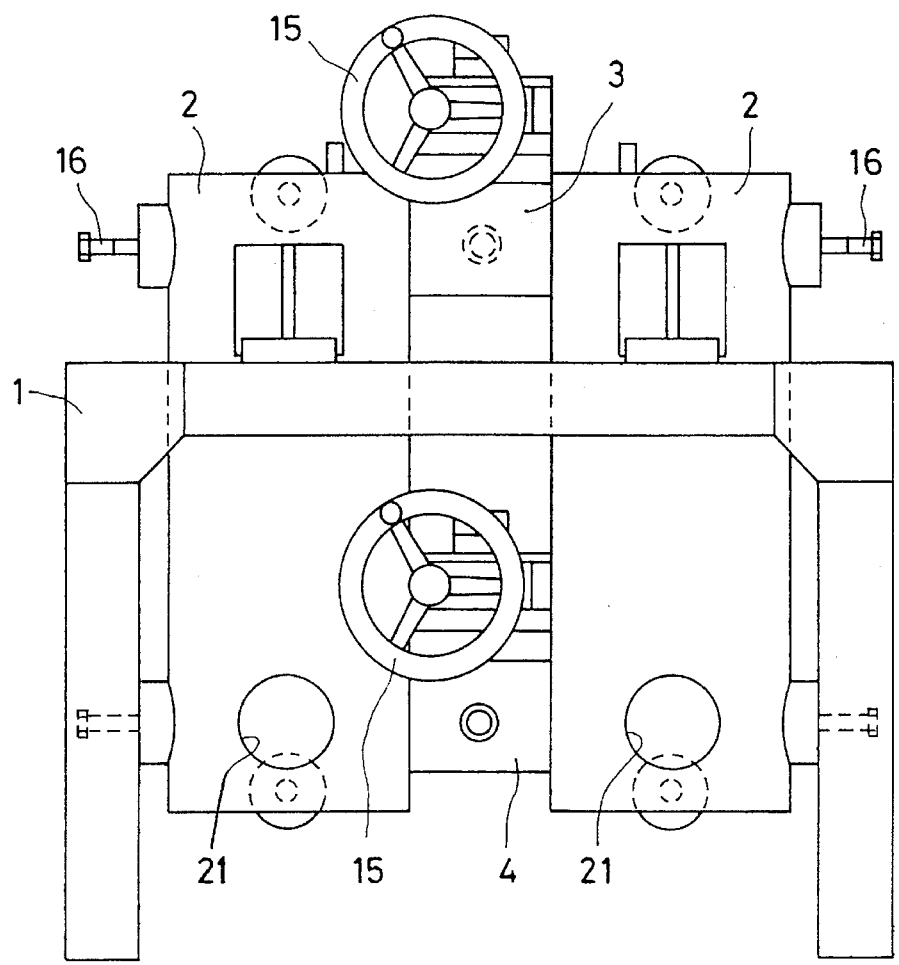
FIG. 1 is a front view of the first embodiment of the filter device according to the present invention.
Figure 2:
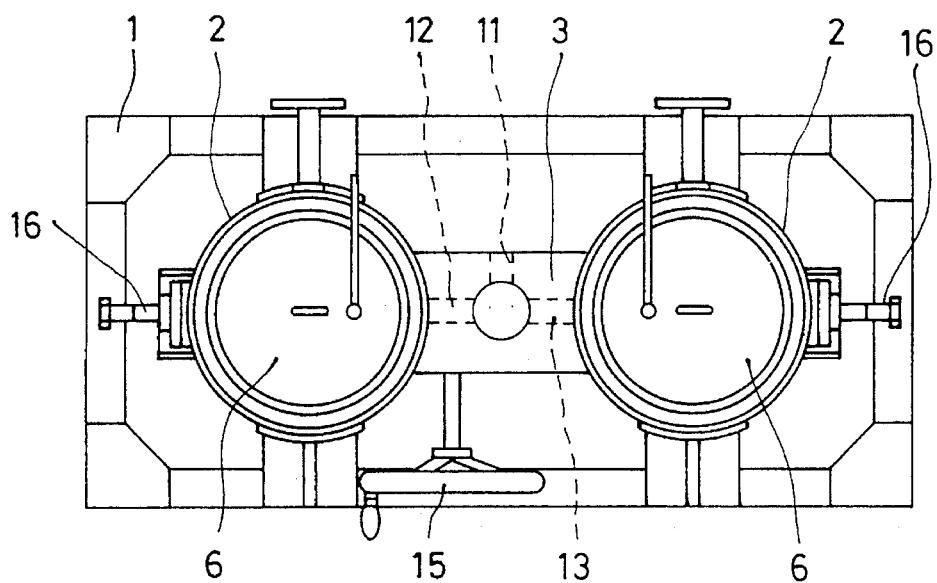
FIG. 2 is a plan view of the same.
Figure 4:
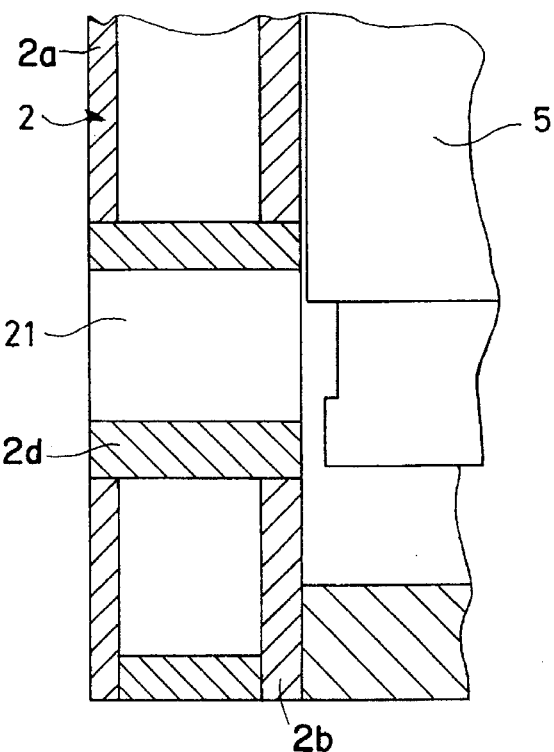
FIG. 4 is an enlarged vertical sectional view of a portion thereof in which openings are formed.

Sleeves 2d extend radially between the inner and outer walls 2a, 2b so as to define through-holes 21 which open into heating units 2 at the bottoms thereof (FIGS. 1 and 4). The filter cases 5 are connected to the changeover valves 3 and 4 by the inlet 8 and the outlet 9 via the passages 17 and 18. The holes 21 are formed opposite or adjacent to the lower passages 17 and have a diameter large enough for a human hand to pass therethrough. Thus, after removing the filter cases 5, it becomes possible to clean the portion of the filter device around the lower passages 17 and inner surfaces of the inner cylindrical walls of the heating units 2 through the holes 21.

The portion of the filter device around the upper passages 18 can be cleaned from the upper openings of the heating units 2 after removing the filter cases 5 without any difficulties.

The filter cases 5 of the first embodiment are set in vertically extending positions in the heating units 2 as shown in the figures. In this state, a fluid is passed through one of the filter cases 5 while heating both of the filter cases 5 with the heating units 2.

If the filter element 7 in one of the filter cases 5 should get clogged, the changeover valves 3 and 4 are operated simultaneously by the handles 15 to cause the fluid to flow through the other filter case 5 and then the filter case 5 carrying the clogged filter element is taken out of the heating unit 2 to clean the clogged filter element 7.

Any fluid left in the changeover valves 3 and 4 after removing the filter case 5 will flow out spontaneously through the passages 17 and 18. Thus, one can wipe out fluid near the lower passage 17 with a cloth by inserting his hand through the holes 21.

Also, the portion around the upper passages 18 can be cleaned by inserting a hand from the upper opening of the heating units 2.

Figure 5:
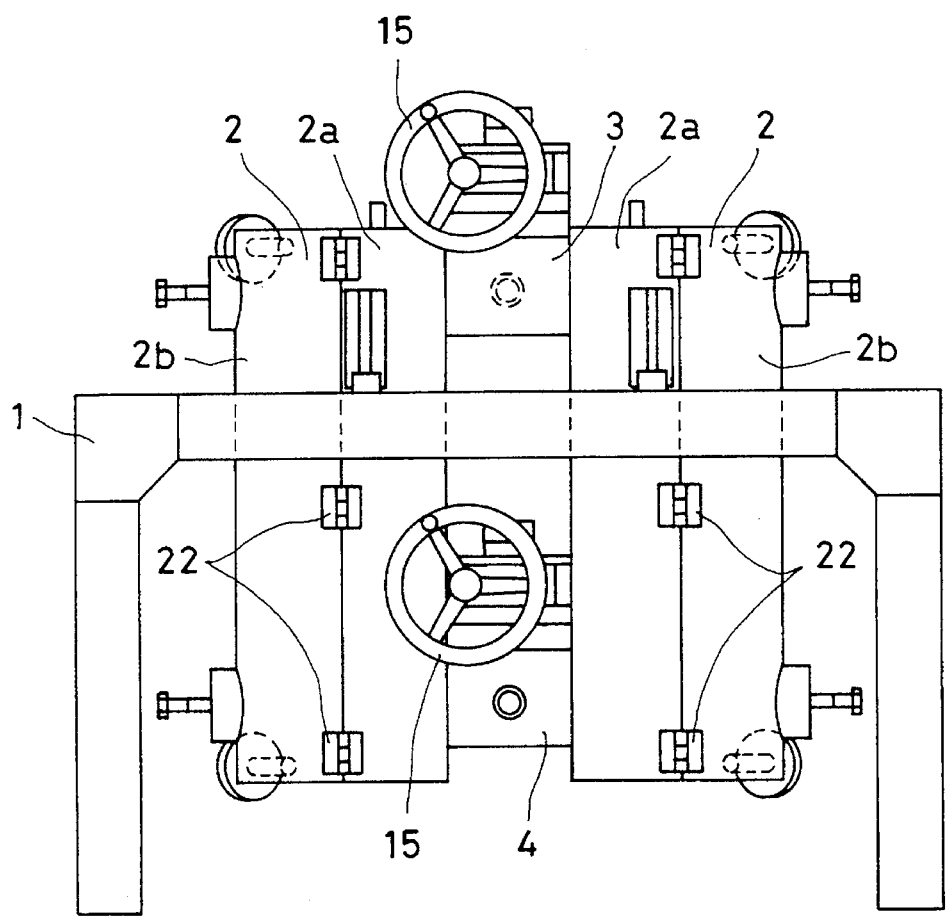
FIG. 5 is a front view of the second embodiment.
Figure 6:
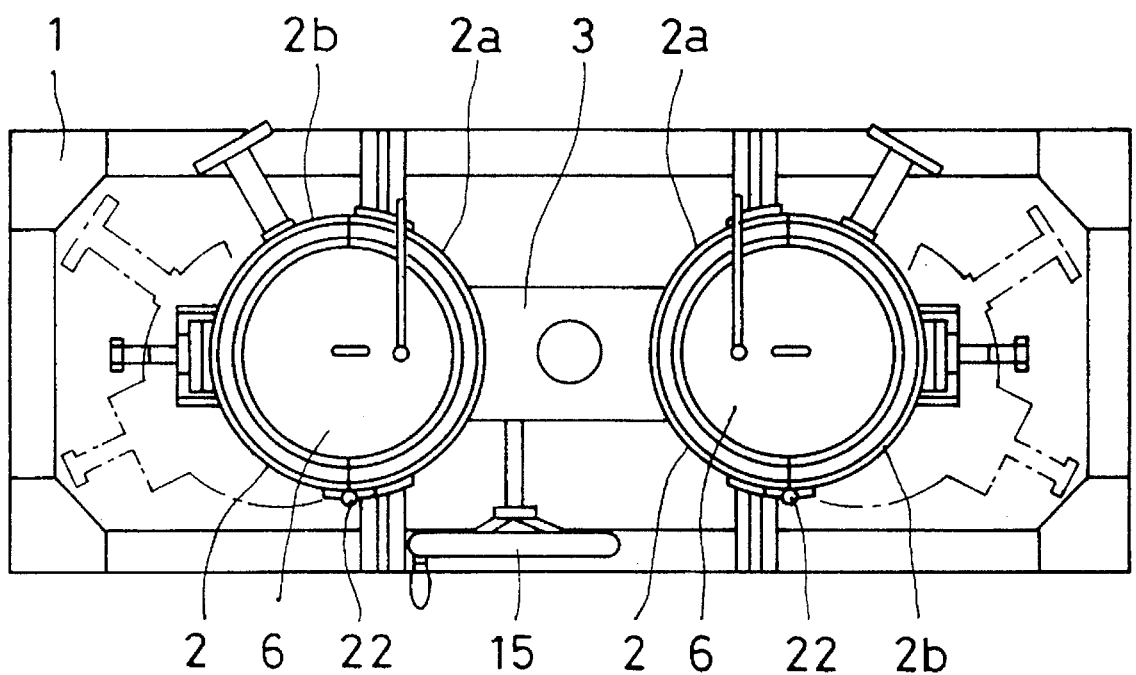
FIG. 6 is a plan view of the same.

FIGS. 5 and 6 show the second embodiment in which like parts are denoted by like numerals and their description is omitted.

In the second embodiment, each of the heating units 2 is axially split into two parts 2a and 2b. The halves 2a of the heating units 2 at the side of the changeover valves 3 and 4 are fixed to the support frame 1. The other halves 2b are connected to the halves 2a by means of hinges 22, so that they are pivotable between open and closed positions about the hinges 22. A fixing member can be used to keep them in a closed position.

In the second embodiment, after removing the filter cases 5, the joint portions can be cleaned by opening the halves 2b of the heating units 2. Since the joint portions are exposed at the opened portions, any remaining fluid can be easily wiped out with a cloth or the like.

In this embodiment, the heating units 2 are normally in the closed position. Thus, the heating capacity is not hampered.

As a third embodiment, although not shown, the heating units 2 in the form of hollow cylindrical walls may be fixed to the support frame 1 and the changeover valves 3 and 4 by means of bolts so as to be independently removable from them. If the heating units 2 are removed after detaching the filter cases 5, it will be easy to clean the inner walls extending around the heating units 2.

In any of the above embodiments, the joint portions between the filter cases 5 and the changeover valves 3 and 4 including the passages 17 and 18 of the heating units 2 extend horizontally. In order to provide an airtight seal at the joint portions, gaskets may be mounted in the passages 17 and 18 so that the inner walls of the joint portions are partially or entirely formed of such gaskets. This arrangement eliminates the necessity of cleaning the joint portions because the gaskets can be taken out together with the filter cases.

Furthermore, in any of the above embodiments, if the filter cases 5 are large, separate heating units can be detachably provided in the top opening of the heating units.

I claim:

1. A filter device comprising: a plurality of discrete cylindrical heating units each including inner and outer cylindrical walls spaced radially from one another so as to define a fluid-accommodating space therebetween, a plurality of filter cases, with each said heating unit housing a respective said filter case which is fitted to said inner cylindrical wall thereof, changeover means for changing the direction of flow of a substance to be filtered so as to flow through a selected one of said filter cases, and heating pipes open to the fluid-accommodating spaces so as to supply heating medium into said heating units from an external source, and each said heating unit also including a sleeve extending between and radially to said inner and outer cylindrical walls so as to define a through-hole extending radially of the cylindrical heating unit and open to the inside of said heating unit at such a location that a portion of the inner surface of the inner cylindrical wall of the heating unit adjacent said changeover means can be accessed and cleaned via said through-hole from the outside of said heating unit.

2. A filter device as claimed in claim 1, wherein said changeover means comprises a plurality of valves each including a valve block and passageways extending through said valve block, the passageways of one of said valves being open to joint portions where said filter cases contact said heating units, wherein said filter cases are freely removable from said heating units, and wherein said joint portions are accessible via said through-holes once said filter cases are removed from said heating units.

* * * * *